Nov. 29, 1949     M. MAERK     2,489,457
FISHING REEL

Filed Aug. 12, 1946     2 Sheets-Sheet 1

Inventor
M. Maerk
By Glascock Downing Seebold
Attys

Nov. 29, 1949 — M. MAERK — 2,489,457
FISHING REEL
Filed Aug. 12, 1946 — 2 Sheets-Sheet 2

Inventor
M. Maerk

Patented Nov. 29, 1949

2,489,457

UNITED STATES PATENT OFFICE 2,489,457

FISHING REEL

Mikkel Maerk, Lokken Verk, Norway

Application August 12, 1946, Serial No. 689,957
In Norway August 13, 1945

5 Claims. (Cl. 242—84.6)

This invention relates to fishing reels and has for its object to provide an improved construction and arrangement of the reeling mechanism and brake means of fishing reels.

A fishing reel according to the invention comprises a spool having an annular flange projecting axially from the spool, a crank for turning the spool consisting of a crank disc freely rotatable relative to the spool and having a handle carried by an arm which is swingably secured to the crank disc and provided with two dogs which are located diametrically opposite each other relative to the fulcrum of the said arm and encompass the annular flange of the spool with a small clearance, so that the said dogs through a small swinging movement of the said arm may be caused to enter into coupling engagement with the annular flange.

Other features and advantages of the invention will appear from the following description with reference to the drawings which illustrate an embodiment of a fishing reel according to the invention.

In the drawings Fig. 1 is a side elevational view of the spool frame.

Figure 1:
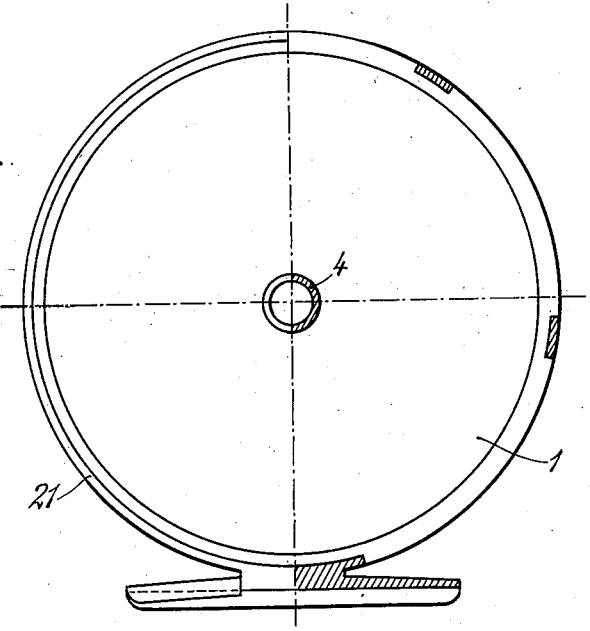
Figure 2:
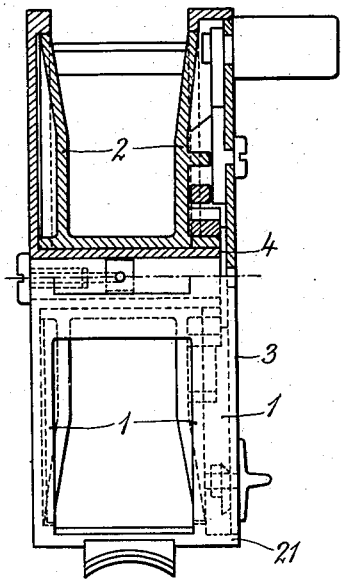
Fig. 2 is an end elevational view partly in section of the reel.
Figure 3:
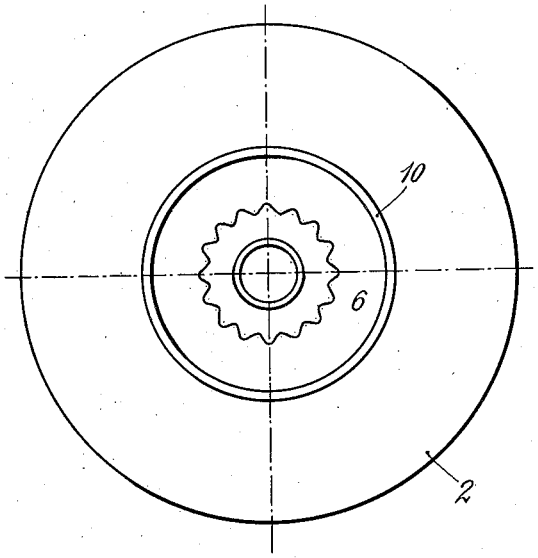
Fig. 3 is a side elevational view of the spool.
Figure 4:
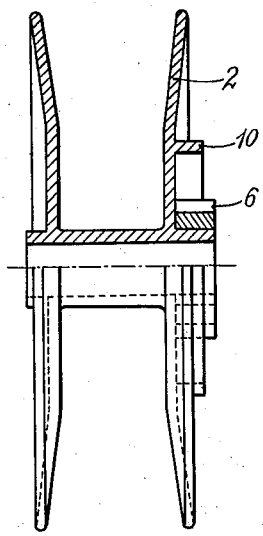
Fig. 4 is a top plan view of the spool partly in cross section.
Figure 5:
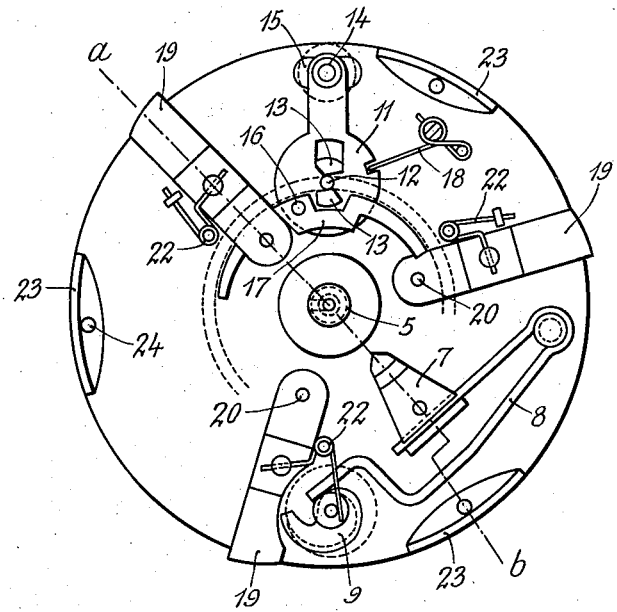
Fig. 5 is a side elevational view of the crank disc.
Figure 6:
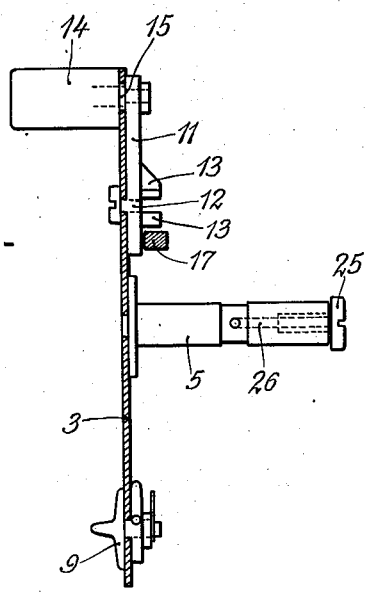
Fig. 6 is an axial section of the crank disc.
Figure 7:
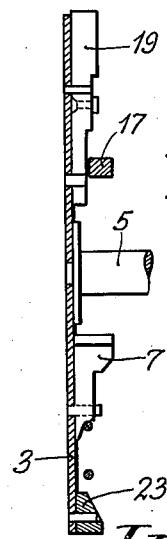
Fig. 7 is a section of the crank disc on the line a—b in Fig. 5.

With reference to the drawings the reel consists of the following main parts: A spool frame 1, which is fastened to the fishing rod in the usual manner, a spool 2 and a crank disc 3. The spool frame carries a shaft 4 for the spool. The shaft is hollow and serves as a bearing for a shaft 5 of the crank disc. A ratchet wheel 6 is secured to the one side of the spool. A ratchet pawl 7 is mounted on the crank disc. A spring 8 for the pawl is adjustable by means of an eccentric 9. An annular flange 10 projects axially from the spool and surrounds the ratchet wheel 6. The said flange 10 serves as described hereinafter both for throwing-in of a crank and as a brake drum.

The crank is in the shape of an arm 11 which is secured to the crank disc 3 and swingable about the pin 12, the center of which is located on the centerline of the annular flange 10. The arm 11 is provided with two dogs 13 which are located diametrically opposite each other relative to the fulcrum of the arm 11 and encompass the flange 10 with a small clearance. The crank action is obtained when the crank handle 14 which is passed through the crank disc to the outside of the latter and has a lost motion in a slot 15 in the crank disc, is turned a little in the reeling-in direction whereby the dogs 13 are pressed against the flange 10 as a claw. Through friction between claw and flange the crank disc 3 is coupled to the spool 2.

On the arm 11 is further mounted a pin 16 on which a brake shoe 17 is turnably mounted. By pulling the crank rearwardly—thus in a direction opposite the reeling-in direction—the brake shoe is pressed against the inside of the flange 10 through eccentric action. The crank is held in released position by means of a spring 18.

The crank disc carries on its inner face a number of pawls 19 which are swingable about the pins 20 and have a somewhat inclined position "rearwardly." The pawls are held against the ring 21 on the spool frame by means of light springs 22. By reverse rotation of the spool the pawls are locked against the ring 21. The pawls may suitably consist of fibre or other material which allows a noiseless operation.

Along the circumference of the crank disc are mounted distance and supporting members 23 formed, for instance, of fibre, and which are swingable about the pins 24 and slide against the spool frame.

The three main parts, the frame, the spool and the crank disc are held together by means of a single screw 25 which is passed into the crank disc shaft 26 from the opposite side of the crank disc. The shaft 26 is hollow and the whole reel is lubricated through this hole which of course is covered by the screw.

The reel above described has the following substantial advantages:

1. When the crank is moved "forwards," that is, in the reeling-in direction the crank disc and the spool are automatically coupled together. The ratchet pawl and the ratchet wheel then rotate together and there is no ratchet action.

2. The crank is disconnected and becomes stationary by a sudden pull on the fishing line (running-out of the fish).

3. The ratchet is automatically thrown in by reverse rotation of the spool.

4. One may brake as desired by moving the crank rearwardly when the spool is reversed by running-out of the fish.

5. Adjustment of the spring of the ratchet pawl by means of an eccentric permits of great variation of the brake action of the ratchet by a single rotation of the eccentric 9.

I claim:

1. A fishing reel comprising a spool including an annular flange projecting axially from the spool, a crank for turning the spool consisting of a crank disc freely rotatable relative to the spool, a handle including an arm fulcrumed to the crank disc, two dogs on the arm located diametrically opposite each other relative to the fulcrum of the said arm and positioned on opposite sides of the annular flange of the spool with a small clearance, so that the said dogs upon a small swinging movement of the said arm will frictionally engage opposite sides of the annular flange.

2. A fishing reel as claimed in claim 1, in which a brake shoe is carried by the arm and is positioned close to the annular flange to engage the inside thereof upon turning the arm in a direction opposite the reeling-in direction.

3. A fishing reel as claimed in claim 1, in which a reel frame is provided to rotatably support and house the spool and crank disc, pawl members swingably secured to the crank disc and which upon reverse movement of the crank disc (reversing of the spool) are moved into engagement with the reel frame for locking the crank disc.

4. A fishing reel as claimed in claim 1, in which a ratchet wheel is mounted on one side of the spool and a spring influenced ratchet pawl cooperating therewith and secured to the crank disc.

5. A fishing reel as claimed in claim 1, in which a ratchet wheel is mounted on one side of the spool and a spring influenced ratchet pawl cooperating therewith and secured to the crank disc and an eccentric for adjusting the tension of the spring of the pawl.

MIKKEL MAERK.

REFERENCES CITED

The following references are of record in the file of this patent:

UNITED STATES PATENTS

| Number | Name | Date |
|---|---|---|
| 1,730,332 | Pfleuger | Oct. 1, 1929 |
| 1,781,695 | Mitchell-Henry | Nov. 18, 1930 |

FOREIGN PATENTS

| Number | Country | Date |
|---|---|---|
| 14,415 of 1905 | Great Britain | Mar. 15, 1906 |